350-417

SR

XR 3,899,778

United Stat

Roberts

[11] 3,899,778

[45] Aug. 12, 1975

[54] MEANS EMPLOYING A MULTIPLE LENS ARRAY FOR READING FROM A HIGH DENSITY OPTICAL MEMORY STORAGE

[75] Inventor: Donald L. Roberts, San Diego, Calif.

[73] Assignee: NCR Corporation, Dayton, Ohio

[22] Filed: Jan. 4, 1974

[21] Appl. No.: 430,932

[52] U.S. Cl. ... 340/173 LM; 340/173 LT; 350/178; 350/230

[51] Int. Cl.[2] ...................... G11C 13/04; G02B 3/00

[58] Field of Search. 340/173 LM, 173 LS, 173 LT; 350/178, 230, 231, 233, 234

[56] References Cited

UNITED STATES PATENTS

| | | | |
|---|---|---|---|
| 3,293,441 | 12/1966 | Kazan et al. | 340/173 LS |
| 3,312,957 | 4/1967 | Fleisher et al. | 340/173 LS |
| 3,432,675 | 3/1969 | Roby | 340/173 LM |
| 3,526,949 | 9/1970 | Genovese | 350/178 |
| 3,573,433 | 4/1971 | Harris | 340/173 LM |
| 3,609,713 | 9/1971 | Wooton et al. | 340/173 LM |
| 3,676,864 | 7/1972 | Maure et al. | 340/173 LM |

OTHER PUBLICATIONS

Harris, Optical Memory, IBM Technical Disclosure Bulletin, Vol. 10, No. 10, 3/68, pp. 1515–1516.

Smith, Electron–Laser Beam Addressable Memory, IBM Technical Disclosure Bulletin, Vol. 15, No. 3, 8/72, pp. 957–958.

Gamblin, Holographic Store Using Noncoherent GaAs Injection Lasers, IBM Technical Disclosure Bulletin, Vol. 11, No. 11, 4/69, pp. 1392–1393.

Mutter et al., Fly's Eye Lens and Fabrication Process, IBM Technical Disclosure Bulletin, Vol. 7, No. 1, 6/64, pp. 99–100.

*Primary Examiner*—Stuart N. Hecker
*Attorney, Agent, or Firm*—J. T. Cavender; James H. Phillips; Edward A. Gerlaugh

[57] ABSTRACT

In order to read information densely recorded on a mask in a page-by-page grid pattern, the mask is disposed between an illumination array and a multiple lens array. Each page of stored information is aligned with an element of the illumination array and a lenslet of the multiple lens array. Upon energization of a selected illumination element, the light issued therefrom passes through the aligned information page and lenslet from which the information-bearing beam diverges. A detector array intercepts the beam from which the information is extracted. Exemplary illumination arrays include a cathode ray tube and a light emitting diode array. Exemplary detector arrays include a television camera and a photosensitive diode array.

14 Claims, 6 Drawing Figures

3899778
OR IN 365/235

MEANS EMPLOYING A MULTIPLE LENS ARRAY FOR READING FROM A HIGH DENSITY OPTICAL MEMORY STORAGE

This invention relates to information storage and, more particularly, to means for reading from high density optical read only memories.

This application contains subject matter related to the disclosure of application Ser. No. 430,933, entitled "High Density Optical Memory Storage Means Employing A Multiple Lens Array" by Donald L. Roberts, filed on even date herewith and assigned to the assignee of the present invention.

In accordance with the invention of the referenced application, information is optically recorded very densely on high resolution film by displaying the information on a page composer and concentrating the displayed information onto the film utilizing a multiple lens array. A moveable aperture is disposed to pass light from the page composer through a selected single lenslet of the array. After a block of information has been recorded through the selected lenslet onto a corresponding area of the film, the aperture is moved to another lenslet, and another block is displayed and recorded. This process is repeated until all desired information has been recorded on the film. The resulting "master" mask may then be processed and reproduced using standard photographic techniques.

A principal purpose of the present invention is to provide complementary means for optically extracting information stored on a mask so prepared.

Thus, it is a broad object of my invention to provide an improved means for effecting information retrieval from mass information storage means.

It is a more specific object of my invention to provide improved read means in an optical memory system.

It is another object of my invention to provide means for reliably reading information stored page-by-page on a mask.

It is yet another object of my invention to provide such means which is simple and relatively economical to fabricate and operate.

Briefly, these and other objects of the invention are achieved by disposing an information mask between an illumination array and a multiple lens array such that energization of a selected element in the illumination array generates a light beam which passes through a corresponding page area of the mask and through an aligned lenslet of the multiple lens array. The lenslet causes the beam to diverge and directs it to a photosensitive detector array which senses the information pattern of the selected page.

The subject matter of the invention is particularly pointed out and distinctly claimed in the concluding portion of the specification. The invention however, both as to organization and method of operation may best be understood by reference to the following description taken in connection with the accompanying drawing of which:

Figure 5:
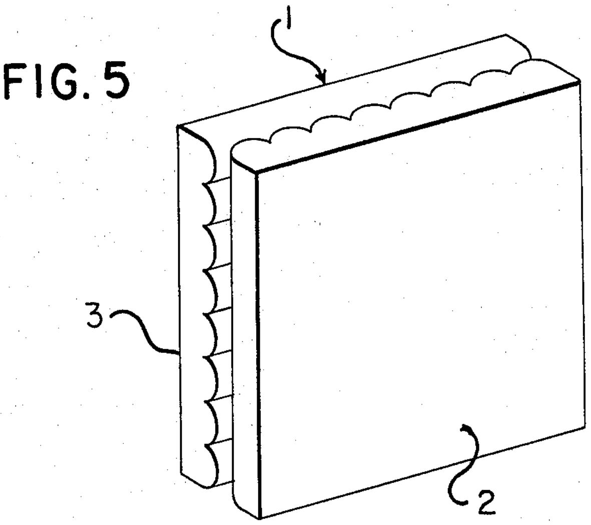
FIG. 5 is a perspective view of a section of a multiple lens array which is a fundamental constituent of the invention.

Attention is first directed to FIG. 5 which illustrates a multiple lens array 1. The multiple lens array is a fundamental component of the system such that a brief statement of its characteristics is deemed useful to a complete understanding of the invention. Briefly, the multiple lens array 1 comprises similar halves 2 and 3 of plastic substrates carrying parallel corrugations or cylinders on one face. The array halves are oriented with the faces carrying the corrugations crossed at 90° and brought together to provide a square lenslet at each intersection of the corrugations. 64 parallel cylinders per inch, a conservative density at the state of the art, provides 4,096 lenslets per square inch (25 parallel cylinders per centimeter provides 625 lenslets per square centimeter). Each lenslet has a speed in the range of f/2.7 to f/3.2 with resolution capability of 400–450 lines/mm. Thus, 4 micron diameter spot sizes may be comfortably worked with to achieve a discrete spot density on the order of $4 \times 10^7$ per square inch ($6.25 \times 10^6$/cm.$^2$).

The array halves are very uniform as a consequence of the fabrication technique employed. A metal negative master can be prepared with a Rhonchi or a Bonnet ruling machine, and array halves are then "cast" from the master. At the state of the art, the center to center accuracy of the lenslet is better than 4/10,000 inch per 20 inches (0.01mm./50cm.), and the focal length tolerance is better than 1/10 of 1 percent.

Figure 1:
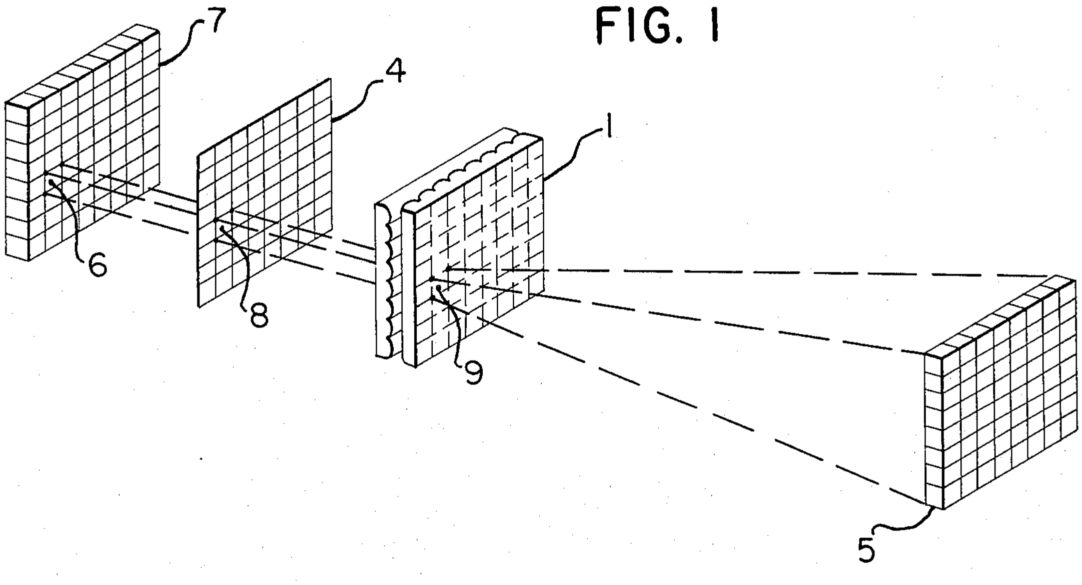
FIG. 1 is an exploded pictorial illustrating the basic concepts of the invention.

Referring now to FIG. 1, it will be observed that a multiple lens array 1 is positioned intermediate an ROM mask 4 and a detector array 5. Light issued from a selected element 6 of an illumination array 7 passes through the information bearing area 8 of the ROM mask 4. The information bearing beam then passes through lenslet 9 of the multiple lens array 1 and is expanded thereby to impinge upon the active area of the detector array 5. Thus, one "page" of information stored in the information bearing area 8 of the ROM mask 4 may be accessed by the detector array 5 as a consequence of energizing the selected illuminator element 6 of the illumination array 7. Any other selected page of information carried by the ROM mask 4 may similarly be projected onto and sensed by the detector array 5 by energizing the corresponding illumination element of the illumination array 7.

It may be noted in FIG. 1, as well as the other Figures, that the arrays and masks are depicted in an 8 × 8 grid. However, it will be understood that, as a practical matter, the grid density is typically on the order of 64 × 64 or 80 × 80 per square inch. In one embodiment of the invention, each page of information appearing on the ROM mask 4 contains 64 words of 40 bits each such that an entire 64 × 64 mask storing 4,096 pages carries in excess of $1 \times 10^7$ binary digits of information. In this specific configuration, the detector array, corresponding to the detector array 5 of FIG. 1, is a 40 × 64 grid. Another system employing 80 × 80 mask and multiple lens array can store over $1.6 \times 10^7$ bits.

Figure 2:
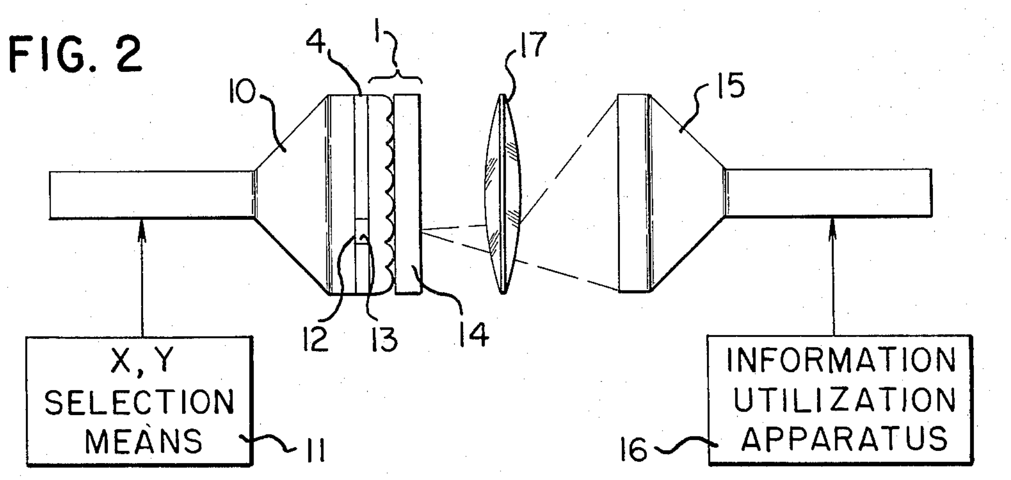
FIG. 2 is a schematic representation of a first embodiment of the invention.
Figure 3:
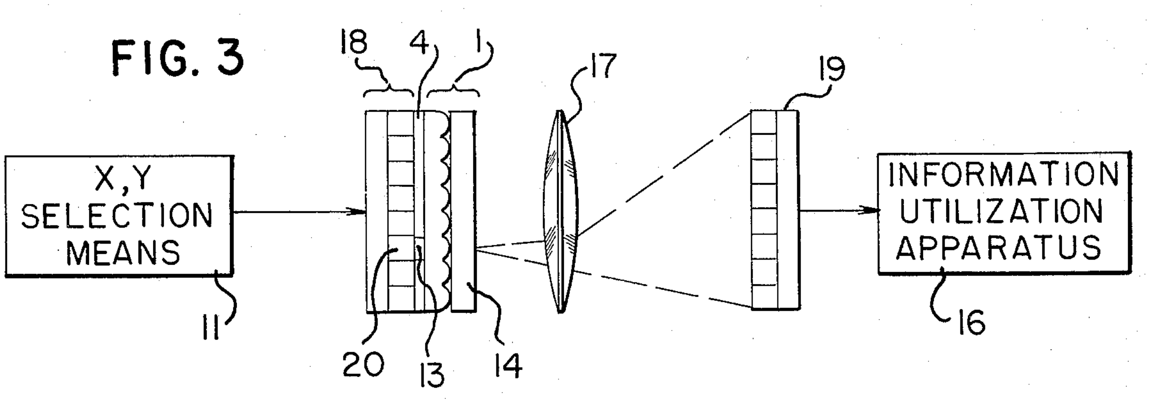
FIG. 3 is a schematic representation of a second embodiment of the invention.

The detector array 5 and illumination array 7 may take various forms. FIGS. 2 and 3 illustrate variations of each which have proven satisfactory in operation. Referring to FIG. 2, it will be noted that the multiple lens array 1 and the ROM mask 4 are juxtaposed quite close to one another. More specifically, the ROM mask 4 is positioned in the focal place of the multiple lens array 1. A cathode ray tube 10 serves as the illumination array under control of X, Y selection means 11. The X, Y selection means 11 is conventional CRT drive apparatus including sweep circuits and means for selectively modulating the intensity of the sweep appearing at predetermined areas on the tube face. Thus, assuming illumination of an exemplary area 12 on the cathode ray tube 10 face, light will pass through the juxtaposed area 13 of the mask and into the lenslet 14 of the multiple lens array 1. The page of information appearing at the area 13 is projected onto the sense face of a TV camera tube 15 which serves as the detector array. The information optically sensed by the camera tube 15 is thus made available to the information utilization apparatus 16. It has been found that a correction lens 17 may usefully be employed to direct the light from a selected lenslet to the camera tube 15 such that the light passes symmetrically about the optic axis of the lenslet and consequently, upon being refracted by lens 17, is directed to the camera tube 15. The distance between the lens 17 and the sense face of the camera tube 15 should therefore be equal to the focal length of lens 17.

In practice, this distance is preferably made adjustable to permit accommodation of uniform dimensional changes of the mask 4 resulting from temperature variations, water absorption, imperfect duplication, etc. Otherwise, a change in mask dimension would result in a shifting of some of the projected page images at the detector means whereby the detector cells do not register with the corresponding bits of the projected image. The magnification of the system is determined by the distance between the lens 17 and the face of the camera tube 15 divided by the focal length of the lenslets of the multiple lens array 1. This magnification, and therefore the distance between the lens 17 and the detector means, must remain substantially constant. However, so long as the detector array remains within the depth of focus of the projected image, the focal length of lens 17 can be varied by a zoom process. Thus, correction to accommodate a specific mask can be performed after it has been inserted into the system by, for example, altering the focal length of lens 17 to acknowledge alignment information provided in predetermined pages of the stored information. It appears that subsequent realignment need only be carried out if extreme environmental changes are encountered.

FIG. 3 illustrates an embodiment of the invention in which the illumination means comprises an array 18 of light emitting diodes, and the detector means comprises an array 19 of photosensitive diodes. Thus, by way of example, energization of exemplary LED 20 results in light passing through the area 13 of the ROM mask containing the page of information to be accessed. Consequently, the information-bearing beam passes through the lenslet 14 of the multiple lens array 1 and diverges to impinge upon the sense face of the photosensitive diode array 19. A correction lens 17 may also be incorporated as discussed above with respect to the FIG. 2 embodiment.

A photosensitive diode detector array suitable for incorporation into the FIG. 3 embodiment of the invention is disclosed in U.S. patent application Ser. No. 366,178, filed June 1, 1973, now U.S. Pat. No. 3,855,582, and entitled "Parallel Biased Photodetector Matrix" by Donald L. Roberts and assigned to the assignee of the present invention.

Figure 4:
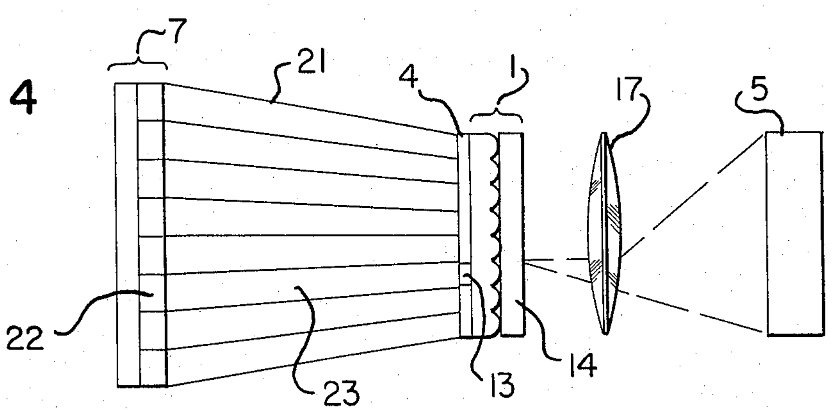
FIG. 4 is a schematic representation illustrating a modification which may be incorporated into either the first or second embodiment of the invention.

Those skilled in the art will recognize the possibility of directly performing some logic functions, such as Inclusive-OR, by projecting superimposed a plurality of pages onto the detector array simultaneously. It is essential, however, that one, and only one, page be illuminated by each light emitting diode (or equivalent) of an illumination array in order to prevent undesired crosstalk. Thus, as shown in FIG. 4, a fiber optic plate 21 may be disposed between the illumination array 7 and mask 4 in order that light issuing from, for example, the area 22 will be brought to bear only on the area 13 containing the single page of information on the mask 4 by the concentrating properties of the fiber optic bundle element 23. Utilization of such a fiber optic plate as a demagnifier permits the use of larger and/or less precise apparatus for the illumination array 7. Perhaps of more import, such use effectively moves the light emitting surface to a position immediately adjacent the mask to avoid light loss. The latter benefit is also realized by a straight fiber optic plate such that incorporation of such a plate into the system may be beneficial even if demagnification is not deemed necessary.

Figure 6:
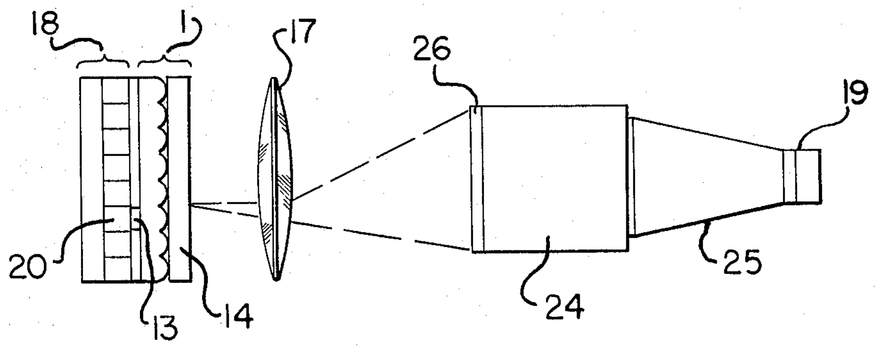
FIG. 6 is a schematic representation of a third embodiment of the invention which enjoys shortened access time.

Information access time can be significantly reduced by increasing the intensity of the light impinging on the detector means. As shown in FIG. 6, this can be accomplished by incorporating an image intensifier tube 24 into the system.

It is advantageous to use a relatively large image at the sense face of the image intensifier tube 24 to limit current density for increased tube life. Additionally, the speed of lens 17 can be slower with a consequent cost decrease. Thus, the augmented image from the image intensifier tube 24 is preferably coupled to the photosensitive diode array 19 by a tapered fiber optic plate 25. The necessity for providing a larger detector array is thereby avoided. At the state-of-the-art, larger detector arrays are more expensive because of lower yields from the fabrication process.

Another state-of-the-art factor is met in the FIG. 6 embodiment. Infra-red light emitting diodes have certain characteristics (such as efficiency) which render them preferred over visible light emitting diodes for use in the illumination array 18. Such use sometimes requires the provision of a converter 26 for translating the information bearing beam into visible light. In a practical embodiment, the converter 26 and the image intensifier are incorporated into a unitary device.

While the principles of the invention have now been made clear in an illustrative embodiment, there will be immediately obvious to those skilled in the art many modifications of structure, arrangement, proportions, the elements, materials, and components used in the practice of the invention which are particularly adapted for specific environments and operating requirements without departing from those principles.

What is claimed is:

1. A system for retrieving information stored page-by page on a mask comprising:

A. illumination means, said illumination means including a plurality of discrete light emitting areas and means for selectively enabling said discrete areas for light emission;

B. a multiple lens array comprising first and second substrates each having parallel corrugations on a face thereof, said faces brought together with the parallel corrugations of said first substrate perpendicular to the parallel corrugations of said second substrate, said corrugations forming at each intersection thereof one of a plurality of lenslets, said multiple lens array being disposed proximate said illumination means such that each of said lenslets is aligned with one of said discrete light emitting areas; and C. photosensitive detector means, said photosensitive detector means including a plurality of light sensitive areas, said photosensitive detector means being disposed to intercept light issued from a light emitting discrete area of said illumination means and passed through a corresponding lenslet of said multiple lens array;

whereby an information bearing area of a mask positioned intermediate said illumination means and said multiple lens array is illuminated by a selected light emitting area, and the resultant information encoded beam passes through the corresponding one of said lenslets and impinges on said photosensitive detector means.

2. The information retrieval system of claim 1 in which said illumination means comprises a cathode ray tube.

3. The information retrieval system of claim 1 in which said photosensitive detector means comprises a camera tube.

4. The information retrieval system of claim 1 in which said photosensitive detector means comprises a plurality of photosensitive diodes disposed in an array.

5. The information retrieval system of claim 1 which further includes a correction lens disposed between said multiple lens array and said photosensitive detector means.

6. The information retrieval system of claim 1 which further includes a fiberoptic plate juxtaposed with said illumination means and disposed between said illumination means and said multiple lens array.

7. The information retrieval system of claim 6 in which said fiberoptic plate disposed between said illumination means and said multiple lens array comprises a plurality of tapered fiberoptic bundles.

8. The information retrieval system of claim 1 which further includes light ampiification means disposed between said multiple lens array and said photosensitive detector means.

9. The information retrieval system of claim 8 which further include a fiberoptic plate disposed between said light amplification means and said photosensitive detector means.

10. The information retrieval system of claim 9 said fiberoptic plate disposed between said light amplification means and said photosensitive detector means comprises a plurality of tapered fiberoptic bundles.

11. The information retrieval system of claim 1 in which said illumination means comprises a plurality of light emitting diodes disposed in an array.

12. The information retrieval system of claim 11 in which said photosensitive detector means comprises a plurality of photosensitive diodes disposed in an array.

13. The information retrieval system of claim 11 in which said light emitting diodes emit light in the infrared portion of the spectrum.

14. The information retrieval system of claim 13 which further includes converter means disposed between said light emitting diode array and said photosensitive detector means.

* * * * *